Jan. 7, 1930.  A. S. HEINRICH  1,742,705
AIRPLANE AND RADIATOR THEREFOR
Filed Nov. 13, 1922  2 Sheets-Sheet 1

Inventor
Albert S. Heinrich
By his Attorneys
Ward, Crosby and Smith

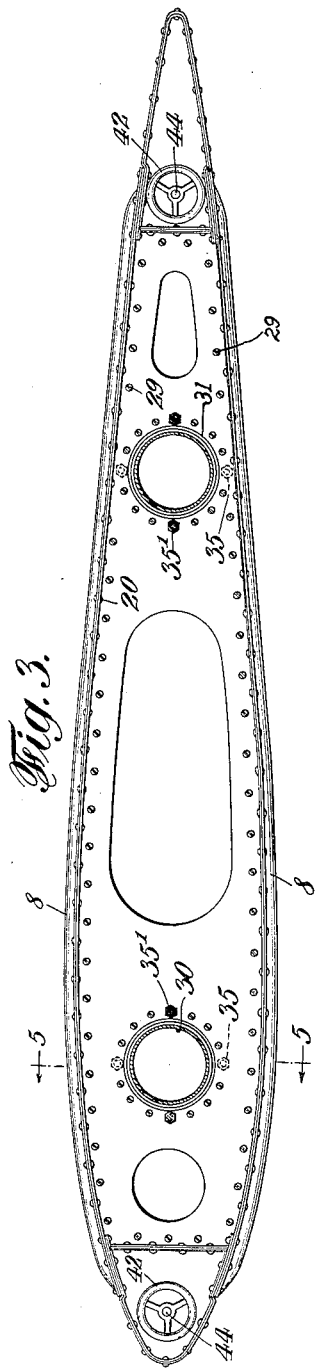
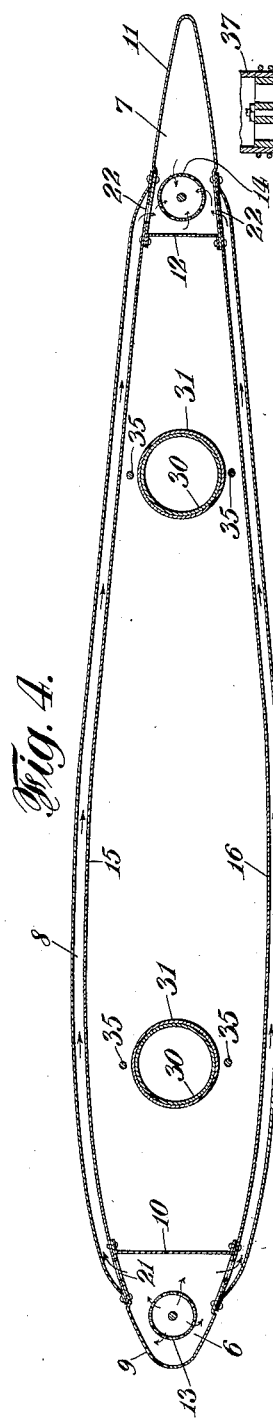
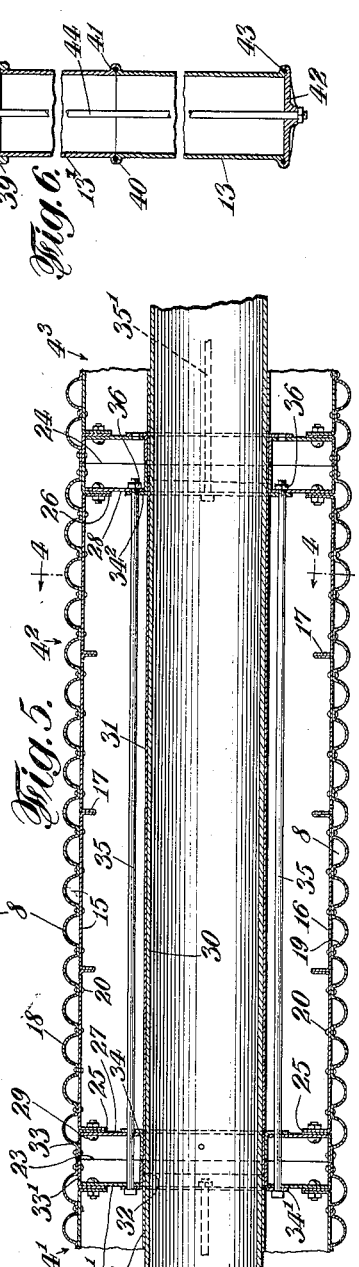

Patented Jan. 7, 1930

1,742,705

UNITED STATES PATENT OFFICE

ALBERT S. HEINRICH, OF FREEPORT, NEW YORK

AIRPLANE AND RADIATOR THEREFOR

Application filed November 13, 1922. Serial No. 600,578.

The invention relates to airplane radiators. It relates particularly to a radiator for use in an airplane, so formed as to serve as an auxiliary sustaining member for the airplane and to the combination of such radiator with the engine and other elements of the airplane.

My improved radiator of aerofoil shape is suitably connected to the cooling jacket of the engine and may be mounted in various positions in which it may aid the wings in sustaining the structure during flight. Preferably the radiator is slidably mounted within a suitable housing, from which it may be extended laterally to increase the sustaining or wing surface and into which it may be more or less withdrawn when desired, particularly when flying at high altitudes, or in cold weather. Preferably also a pair of such housings are provided, one extending laterally from each side of the fuselage with a radiator slidably mounted in each of such housings. Preferably also the radiator is formed of a plurality of readily removable contiguous sections so that the size and heat radiating surface of the radiator may be increased or decreased, as desired. Preferably the radiator is arranged to sustain at least its own weight, when flying.

It is particularly desirable in all aircraft to provide a means for readily changing the radiating surface, when sending an airplane or the like into warmer climates than those for which the radiator was provided, by increasing the exposed radiating surface or enlarging the radiator. When changing the motor of an airplane to a larger or smaller one it is necessary to change the size of the radiator accordingly. This must be done with the least possible trouble and often on very short notice. The present invention, in its preferred form, provides a means for meeting these varying conditions which is impossible or impracticable with the present type radiator commonly in use, in that my improved radiator is built up of interchangeable sections detachably secured together, and readily removable one from the other without in any way disturbing the connection to the motor.

Also, it is very desirable, as is well recognized in the art, to diminish the head resistance of airplanes. This is particularly desirable at high speeds as the resistance varies directly as the velocity squared. The lift of the wings or aerofoils also varies directly as the velocity squared.

The relations may be more clearly seen from the following simple formulæ:—where $R$=resistance, $S$=surface area; $K_r$=resistance coefficient, $V$=velocity; $L$=lift, and $K_L$=lift coefficient; $R=K_r SV^2$ and $L=K_L SV^2$.

It is also well understood in the art that the degree of radiation of a radiating surface varies directly as a function of the velocity of the air passing over it.

In other words, with the other condition of flight remaining constant, a decrease in head resistance will result in an increase in speed in the ratio of the above formulæ expressed in the form:

$$V=\sqrt{\frac{R}{K_r S}}.$$

Likewise when the speed is increased the lifting surface may be decreased in the ratio of $L=K_L SV^2$.

And since the degree of radiation of the radiator varies according to the relative velocity of the speed of the air passing over its exposed surface, less exposed surface is necessary at this higher speed.

It will, therefore, be seen that the three variations in flight conditions set forth in the three paragraphs immediately preceding are desirable at one and the same time and are closely allied and more or less dependent each on the other, i. e. (1) the decrease of the total sustaining surface or effective area, (2) the decrease of the radiating surface, and (3) the consequent decrease of the resistance, and hence the increase of the velocity of the airplane.

From the above explanation and the following description it will be seen that this invention, in its preferred form, combines these desirable features in a most efficient way by providing for the simultaneous variation of both supporting area and exposed radiating surface.

The invention consists in the novel construction, arrangement and combination of parts hereinafter described according to the prefered embodiments thereof. The invention will be more particularly pointed out in the appended claims.

In order that the invention may be more clearly understood attention is hereby directed to the accompanying drawings, illustrating certain forms of the apparatus embodying the invention. In the drawings Fig. 1 represents a top plan view of an airplane equipped with the invention, certain parts being broken away to show underlying parts;

Fig. 3 is an end elevation of the improved radiator as viewed in the direction of the arrow 3, in Fig. 1, the end closure of the radiator being removed;

Fig. 4 is a front to rear vertical section taken through the radiator, this figure being taken upon line 4—4 of Fig. 5;

Figure 1:
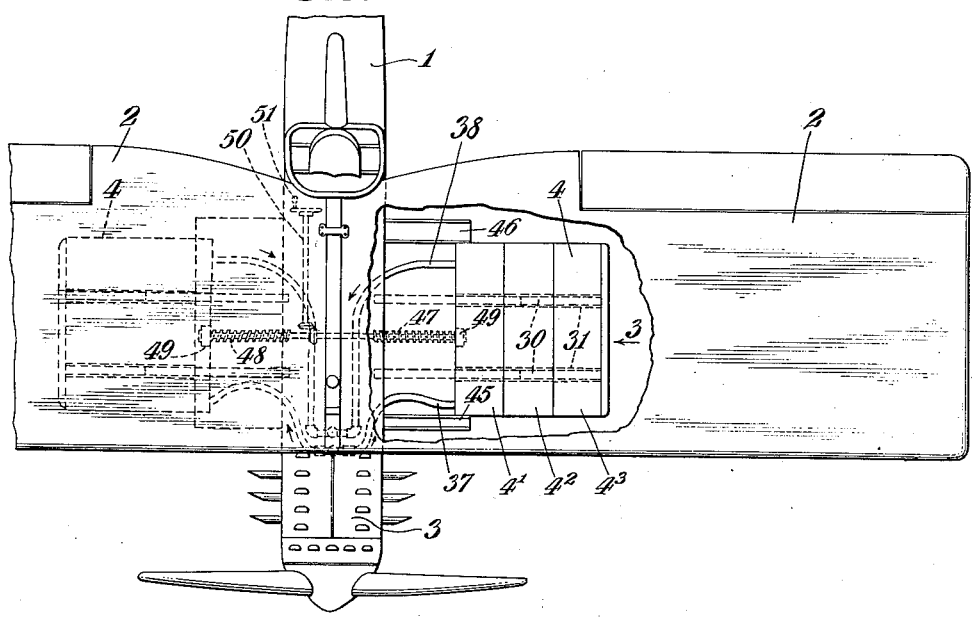
Figure 2:
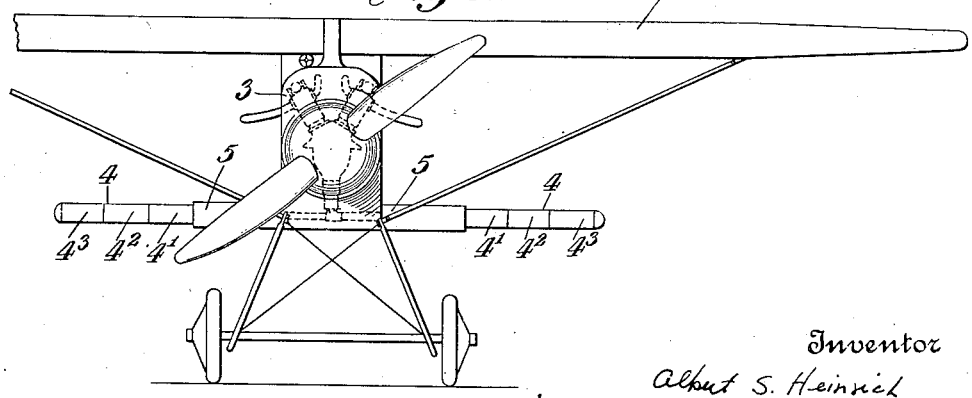
Fig. 2 is a front elevation of the airplane.

Fig. 5 is a transverse vertical section taken on line 5—5 of Fig. 3, Figs. 3, 4 and 5 showing the radiator on an enlarged scale in comparison with Figs. 1 and 2; and Fig. 6 is a partial sectional view showing a detail of construction.

Referring to the drawings I have illustrated an airplane having a fuselage 1 and laterally extending wings 2, 2, the machine being shown as a what may be termed a biplane although the invention is not limited in its applicability to any particular type of airplane. An engine 3 is indicated having the usual cooling jacket.

I have illustrated a pair of radiators indicated generally by reference characters 4, 4, which are shown as slidably mounted in the housings 5, 5, one extending laterally from each side of the fuselage. The radiators 4, 4, are of aerofoil shape and the housing members 5, 5, are also preferably of aerofoil shape, so that both the housings and the radiators will aid in sustaining the airplane in flight. These housings and their associated radiators substantially forming lower planes.

Each radiator is shown as formed of three detachable sections $4^1$, $4^2$ and $4^3$, the number of the sections being readily varied. Each of these sections or units constitutes a complete radiator of aerofoil shape. Each of these sections, referring to Fig. 4, comprises a compartment 6 at the leading edge of the radiator into which the water to be cooled enters, and a compartment 7 in the trailing edge of the radiator from which the cooling fluid is returned to the engine jacket. A plurality of cooling tubes 8 connect the forward and rear compartments and extend along both the upper and lower surfaces of the radiator structure. As is evidenced by the section Fig. 4, or the end view Fig. 3, the structure thus formed is of aerofoil shape, of the type well-known in the art as a double cambered aerofoil.

The forward compartment 6 is formed of a metal sheet 9 which preferably is curved to form the leading edge of an aerofoil structure, the compartment being closed at the rear by a vertical closure or partition, 10. The rear compartment 7 correspondingly is formed of a metal sheet 11 shaped to provide the trailing edge of an aerofoil structure and closed at its forward end by a vertical member 12. Fluid to be cooled is introduced into compartment 6 by a perforated pipe 13 while cooling fluid is led from compartment 7 by the perforated pipe 14.

Members 9 and 11 are connected together by curved sheet metal members 15 and 16 of aerofoil shape which may be stiffened by providing the same with suitable inwardly directed flanges 17, Fig. 5. Radiator tubes are formed by securing corrugated members 18 and 19 to the upper and lower surfaces of members 15 and 16 respectively. These corrugated members are suitably secured to the underlying members as by rivets 20 provided between each of the bends or corrugations of members 18 and 19, water tight joints being formed. Radiator tubes are thus provided between the various corrugations of members 18 and 19 and the curved plates 15 and 16, these tubes opening into compartments 6 and 7 through openings 21 and 22 respectively, it being noted that the tubes formed, as described, extend over the end compartments sufficiently at the ends of the tubes to permit said connection being made. It will be obvious to those skilled in the art that these tubes may also be made of separate pieces, each attached to plate 15 or 16 and forming therewith separate passages or tubes connecting tanks 6 and 7.

Each section is closed at its ends, that is at its edges which extend in the direction from front to rear of the airplane, when the radiator is mounted in position, by closure members such as are shown in Fig. 5. As is indicated in that figure one of the radiator units, such as the unit $4^2$, is bounded at its ends by the planes indicated at 23, 24. The members 15 and 16 are provided with flanges 25, 26, which may be secured to the closure members 27, 28, preferably by removable bolts or screws 29.

The radiators are preferably slidably mounted in position in the airplane by providing rods or tubes 30 which extend laterally from the opposite sides of the fuselage, a pair of such tubes 30 preferably being provided on each side. The radiator is provided with sleeves 31 which are slidably mounted on the tubes 30.

Each section of the radiator is provided with a sleeve 31, which, as shown in Fig. 5, in reference to the radiator section $4^2$, may extend slightly beyond the end 23 of the section, as is indicated at the point 32, while at the other end of the section the sleeve 31 ends a corresponding distance short of the line 24. The end closures of the various sections are, of course, provided with openings through which the tubes 30 extend.

As is indicated in Fig. 5 the end closure referred to as 27 has secured to its outer edge a peripheral outwardly extending flange 33, the outer edge of which establishes the end plane 23 of the section referred to. Member 27 is provided with openings within which the sleeves 31 closely fit. Flanged discs 34 are secured to plate 27 about the openings referred to and to the outer end portions of sleeves 31, the horizontal cylindrical flanges of members 34 terminating at the end plane 23. The construction is similar at the opposite end closure of the section.

When a number of radiator sections are secured together as shown, the end flange 33 of one section will be abutted against the corresponding end flange $33^1$ of the adjacent section. The two sections such as $4^1$ and $4^2$ will then be removably secured together as by means of bolts 35, 35, which are extended adjacent to the sleeves 31 through the end closure members 28 and 27 of section $4^2$ and the end closure $28^1$ of section $4^1$, the latter being the end closure of section $4^1$, the peripheral flange of which is abutted against the peripheral flange of the end closure 27, of section $4^2$. Bolts 35 also extend through the vertical flanges of the member 34 and the corresponding member $34^2$ at the opposite end of section $4^2$ and through the corresponding flanged members $34^1$ of member $4^1$. The cylindrical flanges of members 34 and $34^1$ will abut along line 23 and the guiding tubes 31 and $31^1$ of sections $4^2$ and $4^1$ will abut along the vertical plane 32. Nuts 36 at the outer ends of bolts 35 being tightened sections $4^1$ and $4^2$ will be firmly but removably secured together. When another section is to be added to the structure, such for example as the section $4^3$, the connection is made in the same way as has just been explained, except that preferably the bolts $35^1$ are positioned at the sides of the guiding tubes instead of at the top and bottom, that is the bolts such as $35^1$ are mounted each ninety degrees away, around the tube, from one of the bolts 35 of the adjacent section.

Pipes 13 and 14 in the leading and trailing compartments 6 and 7, in the innermost section of the radiator, such as $4^1$, are connected at their inner ends to flexible tubing, such as the tubing indicated in Fig 1 at 37 and 38, tubing 37 leading from the engine jacket to compartment 6 of section $4^1$ of the radiator, while tubing 38 leads from pipe 14 in rear compartment 7 of section $4^1$ back to the engine jacket.

The perforated pipe, such as the pipe 13, within a compartment of one unit, such as the unit $4^1$, is connected to the corresponding pipe of the corresponding compartment of the next section, when the sections are bolted together, by suitable connecting means so as to make a continuous pipe extending from one radiator section into the next with tight joints at the connections between the pipes. Thus, in the detail section, Fig. 6, the leading-in flexible tubing 37 is shown as mounted on a peripheral shoulder of a spider 39 secured on the end of the perforated pipe $13^1$ by which the water from the jacket is to be distributed within compartment 6 of section $4^1$. When a second section $4^2$ is positioned against section $4^1$ of the radiator the leading-in pipe 13 for that section will have its open end abut against the open end of pipe $13^1$ as indicated in Fig. 6, at 40, a gasket 41 being interposed at the joint. Pipe $13^1$ will extend slightly through the end partition such as $28^1$ of its section $4^1$ with a suitably sealed joint. The outermost length of aligned pipe, such as the pipe 13, shown in Fig. 6, will be closed by an end closure 42 sealed against the end of the pipe by a gasket 43, a bolt 44 extending through the aligned pipes and through spider 39 and end closure 42 to hold the lengths of pipe in alignment and with tight joints. If the radiator were used with one section only, such as section $4^1$, the end closure 42 would, of course, be mounted at the outer end of the pipe section, such as $13^1$ of that radiator section and held in position by a bolt similar to the bolt 44. The connections for the pipes 14 leading away from the radiator are, of course, similar to those just described.

As stated, a pair of radiators are shown slidably mounted in a pair of housings 5, 5. Each of these housings may be provided with beams 45, 46, at its leading and trailing edges between which the radiator is slidably mounted, the housing member also being covered at top and bottom and given the aerofoil shape, as stated. The radiators may be moved outwardly from, or retracted into, their housings by suitable control means such as worms 47 and 48 having right and left hand screws respectively, which are adapted to turn through nuts 49, 49, secured to the two radiators. Worms 47 and 48 may be rotated in one direction or the other by suitable means under the control of the aviator, or under thermostatic control, such as a shaft 50 having a bevelled pinion meshing with a corresponding bevelled pinion on the shaft on which worms 47 and 48 are provided, shaft 50 being shown as having a handle 51 which may be rotated by the aviator.

It may be advantageous to draw the radiators more or less within the housing when flying at high altitudes, or when the weather is particularly cold, or when the engine is shut off, etc., when less radiating surface is required, the housings 5 serving to blanket or cover the radiators more or less in accordance with the positioning of the radiators under the aviator's control.

It should be understood that the invention is not limited strictly to the details of construction described, but is as broad as is indicated by the accompanying claims.

What I claim is:

1. In an airplane, the combination with a housing of a radiator of aerofoil shape adapted to extend laterally from the housing, and means for extending the same from or retracting it into said housing.

2. In an airplane, the combination of a laterally extending member shaped to serve as a sustaining means for the airplane, a radiator carried by said member, shaped to serve as an auxiliary sustaining means, means for extending the radiator laterally beyond said member and for retracting the same, an engine cooling jacket, and flexible connections between said jacket and radiator.

3. In an airplane, the combination with the fuselage and engine having a jacket, of supporting rods extending laterally from the fuselage, a radiator of aerofoil shape having guiding tubes slidably mounted on said rods, means for moving the radiator in or out on said rods, and flexible connections between the radiator and jacket.

4. In an airplane, the combination with the fuselage and engine having a jacket, of a housing of aerofoil shape extending laterally from the fuselage, a radiator of aerofoil shape slidably mounted in the housing, means for moving the radiator in to or out of the housing, to extend laterally beyond the same in the latter case, and flexible connections between the radiator and jacket.

5. In an airplane, the combination with the fuselage and engine having a jacket, of a housing secured to the fuselage, a radiator movably mounted in the housing, means for moving the radiator into or out of the housing and supporting the same in either position, and flexible connections between the radiator and jacket.

6. In an airplane, the combination of a radiator, presenting an exposed radiating surface, aerofoils associated with the airplane, and means for simultaneously varying the effective aerofoil surface area and the exposed radiating surface of said radiator.

7. In combination with an airplane, a liquid cooled motor, a radiator of aerofoil form furnishing radiating surface for the liquid of said motor and forming a part of the sustaining surface of said airplane, and means for simultaneously varying the exposed area of the sustaining and radiating surfaces.

8. In combination with an airplane, a liquid cooled motor, a radiator of aerofoil form furnishing radiating surface for the liquid of said motor and forming a part of the sustaining surface of said airplane, and means for simultaneously decreasing, or increasing, the exposed area of the sustaining and radiating surfaces.

9. In combination with an airplane, a liquid cooled motor, a radiator of aerofoil form furnishing radiating surface for the liquid of said motor and forming a part of the sustaining surface of said airplane, and a single means for simultaneously varying the exposed area of the sustaining and radiating surfaces.

10. In combination with the fuselage of an airplane, and its wings, a radiator of aerofoil shape, supported separately from and independently of the supports of any of said wings, said radiator comprising a plurality of contiguous readily attachable and detachable sections, to which a section may be added or from which a section may be removed at will to vary the effective lifting and radiating surface of the component radiator.

11. In combination with the fuselage of an airplane, and its wings, a radiator, supported separately from and independently of the supports of any of said wings, comprising a plurality of contiguous readily attachable and detachable sections of aerofoil shape, each section comprising front and rear tanks forming, respectively, its leading and trailing edges, and connecting tubes extending along its opposite cambered surfaces, the respective sections being adapted to be detachably connected in side-by-side relationship and their respective tanks coupled in end-to-end relationship whereby the size of the radiator may be readily varied at will by the removal or addition of a section.

In testimony whereof I have signed my name to this specification.

ALBERT S. HEINRICH.